United States Patent
Frier, Jr. et al.

(10) Patent No.: US 6,447,574 B1
(45) Date of Patent: Sep. 10, 2002

(54) SYSTEM, PROCESS AND APPARATUS FOR REMOVAL OF POLLUTANTS FROM GASEOUS STREAMS

(75) Inventors: James Leake Frier, Jr., Longview; Malley R. Bass, Lone Star; Thomas K. Ewan, Daingerfield, all of TX (US)

(73) Assignee: Global Clean Air, Inc., Dallas, TX (US)

( * ) Notice: Subject to any disclaimer, the term of this patent is extended or adjusted under 35 U.S.C. 154(b) by 0 days.

(21) Appl. No.: 09/896,003

(22) Filed: Jun. 29, 2001

(51) Int. Cl.⁷ .............................. B01D 45/00
(52) U.S. Cl. ................ 95/29; 95/32; 96/361; 96/389; 261/76; 261/116; 261/DIG. 78
(58) Field of Search .................... 95/29, 32; 96/234, 96/256, 355, 359, 361, 376, 389, 323; 261/116, 76, DIG. 54, DIG. 78

(56) References Cited

U.S. PATENT DOCUMENTS

| | | | |
|---|---|---|---|
| 3,763,634 A | * 10/1973 | Alliger | 261/118 |
| 3,852,408 A | 12/1974 | Ewan et al. | 423/242 |
| 3,852,409 A | 12/1974 | Martin et al. | 423/242 |
| 3,894,851 A | * 7/1975 | Gorman | 261/118 |
| 3,912,469 A | 10/1975 | Ewan et al. | 55/238 |
| 4,141,701 A | 2/1979 | Ewan et al. | 55/90 |
| 4,272,499 A | 6/1981 | Cason et al. | 423/242 |
| 4,319,891 A | * 3/1982 | Anderson et al. | 422/186 |
| 4,379,679 A | * 4/1983 | Guile | 261/DIG. 78 |
| 4,921,886 A | 5/1990 | Ewan et al. | 423/235 |
| 6,019,820 A | * 2/2000 | Leverett | 261/115 |
| 6,280,502 B1 | * 8/2001 | van Veen et al. | 55/396 |

* cited by examiner

Primary Examiner—David A. Simmons
Assistant Examiner—Frank M. Lawrence
(74) Attorney, Agent, or Firm—George W. Rauchfuss, Jr.; Ohlandt, Greeley, Ruggiero & Perle, L.L.P.

(57) ABSTRACT

Pollutant molecules and/or particles are removed from a stream of polluted gas utilizing moisture-containing sonic or supersonic shock waves passing through the stream of polluted gas stream to alter, change, modify, grow or otherwise change the molecules and/or particles to render then removable or separable from the gas stream.

28 Claims, 3 Drawing Sheets

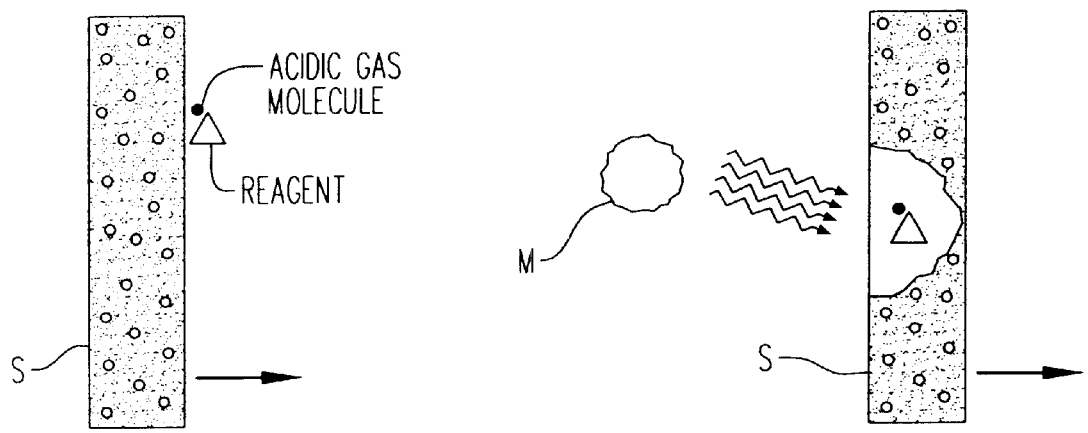
FIG. 1A  FIG. 1B
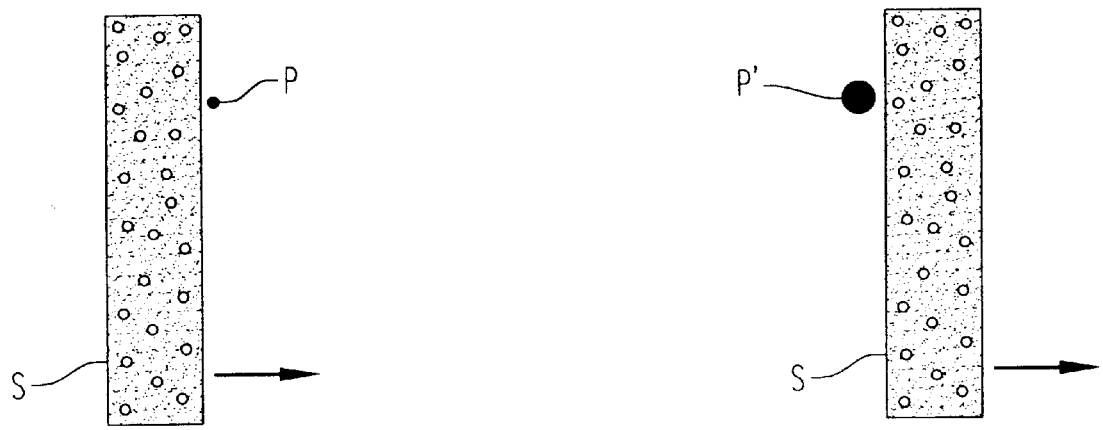
FIG. 2A  FIG. 2B

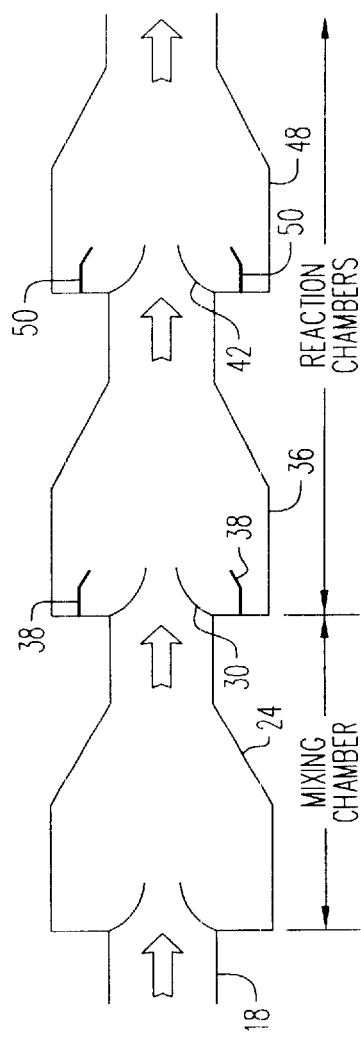
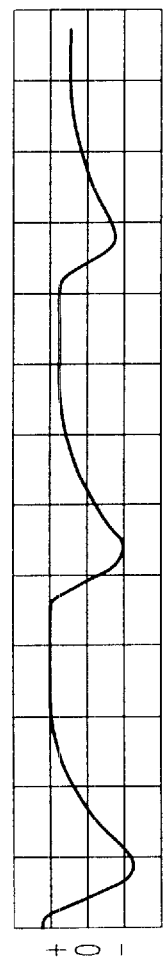
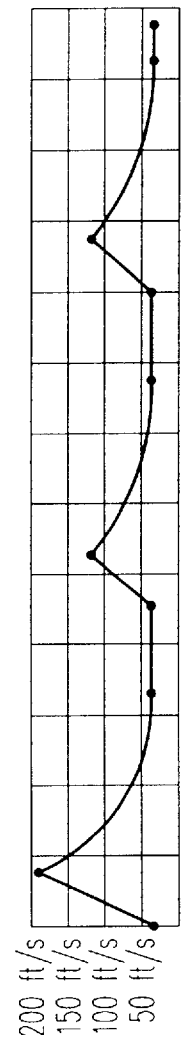
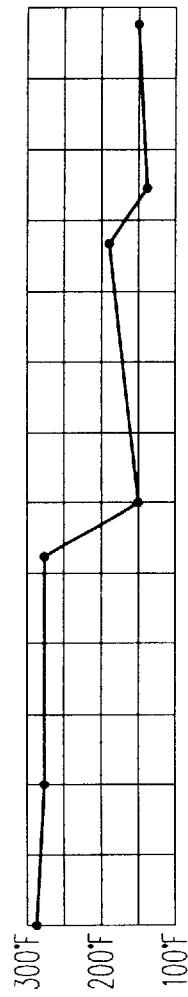
PRESSURE, VELOCITY, TEMPERATURE PROFILE
PRESSURE
VELOCITY
TEMPERATURE
FIG. 4

SYSTEM, PROCESS AND APPARATUS FOR REMOVAL OF POLLUTANTS FROM GASEOUS STREAMS

FIELD OF THE INVENTION

This Invention relates to a system, process and apparatus for the removal of pollutants from carrier gas streams resulting from chemical, industrial, heat and power, smelting, refining, combustion and other processes, and particularly to cleaning such carrier streams of acid gases and other water-soluble or insoluble pollutant gases, vapors and/or particulates.

BACKGROUND TO THE INVENTION

Air pollution has long been recognized as a serious problem in the health and ecological areas and otherwise. Recognizing this fact, in 1970 The Clean Air Act was passed by the US Congress, and subsequently further legislation and regulations have been enacted by federal, state and local jurisdictions in order to control and/or reduce air pollution.

The pollution in the air may comprise solid or liquid particulate matter and various innocuous or noxious gases found in many streams as well as gaseous effluent or by-product pollution in numerous process streams. The legislation and regulations have attempted to eliminate or limit the amount of pollutants discharged into the atmosphere by polluted gas streams.

The pollutants found in the air may vary widely in form, size and chemical nature. For example, the particulate matter may be liquids or solids that, in turn, may be chemically active or inert. The particles may vary in size from substantially smaller than 0.01 micron up to a fraction of an inch and may include metal or mineral values of economic significance. The gaseous pollutants may be relatively innocuous gases, such as carbon dioxide, or highly toxic gases including gases such as hydrogen sulfide, sulfur dioxide, carbon monoxide, or various of the nitrogen oxides. Some of the gaseous pollutants may be further reacted in the atmosphere to form acids or other substances that may have deleterious effects on the environment.

One method of reducing pollution and attempting to meet the emission standards of the various legislation and regulations has been to attempt to control the pollutants at the source. However, this approach is not always available and, in many instances, is neither possible nor practicable. Moreover, many of the pollutants are submicronic particles. Such submicronic particulate, though constituting only a very small portion of the total weight of the emission, may represent the vast majority of the number of particles emitted and also may represent the vast majority of the total toxic material emitted. Thus, the contribution of the submicronic particulate to the degradation of the ambient atmosphere is disproportionate to its relatively small weight. As recognition of this effect grows, it is expected that legislatures and other control agencies will place greater emphasis on the removal of fine particulate, particularly in view of the availability of new instrumentation to detect such smaller and smaller sized particulates.

Various methods and types of apparatus have been employed over the years to remove particulates from gas streams where these pollutants cannot be removed at their source. One category of such equipment is fabric filters. In the filter separator a screen having interstitial openings of any desired size is placed as a barrier to the flow of the particulate-containing gas stream. A common form of the filter separator is known as a bag-house which comprises a large number of fabric bags of felt or woven fabrics having a fine mesh to trap the particulate from the gas stream. While the bag-house separator is one of the most effective of the prior art devices for the removal of fine particulate, it has several inherent disadvantages that prevent its adoption for many processes. First, the bag-house is a relatively large installation and may employ several thousand fabric bags. As a result of its complexity, the bag-house is expensive to install and maintenance and operating costs are high due to the necessity for frequent cleaning and replacement of the bags. Secondly, the operating temperature is limited by the nature of the fabric material so that cooling of the gases to be treated is frequently necessary. Finally, while the bag-house is quite effective for particulate removal down to a size of about 1 micron, it is not well adapted to the removal of pollutants such as sulfur dioxide where some type of chemical reaction is necessary nor to the removal of particles below 1.0 micron in size which may be found in fumes and smog.

Another commonly used device is the mechanical separator, the so-called cyclone or centrifugal separator. In this apparatus the particulate-containing gas is generally introduced tangentially into a cylindrical or conical vessel and, as the direction of the gas stream is changed, the particulate is separated therefrom. While the cyclone is effective for large particulate that will readily separate from a gas stream due to gravitational or inertial forces, its efficiency decreases with smaller particulate and becomes largely ineffective with respect to particulate which is less than about 10 microns in size. Also, the energy requirements of the cyclone are proportional to the pressure drop through the cyclone and increase rapidly as the particulate decreases in size.

A still further category of gas cleaning equipment includes the precipitator that employs electrostatic forces. In this device, a particulate-containing gas stream is charged to one polarity and is then passed between oppositely charged plates that, in turn, attract the particulate. The particulate may then be removed by mechanical means. The electrostatic precipitator becomes largely ineffective for particulate less than about 2 to 3 microns in size. In addition to relatively high capital costs, the precipitator is expensive to operate and its performance tends to deteriorate in time. Where the effluent gas contains combustible material there may also be safety hazards that inhibit the use of the precipitator. Other inadequacies of the precipitator include the inability to remove sulfur dioxide and sensitivity to particulate resistivity.

Some separation may result from the action of gravitational forces though, in the above equipment, these forces were not intentionally exploited. Thus, if desired, a particulate-containing gas stream may be introduced into a large settling or stilling chamber where the velocity is reduced essentially to zero. Again, this device is most effective for large particulate. As the particulate becomes smaller, the time required for settling increases.

The aforementioned dry types of devices and systems have not been particularly effective or very economical. Thus there have been proposed various wet systems. During the 1970's a number of improvements were made in the wet scrubbing technology. Ejector driven or fan driven scrubbers employing centrifugal separators or separated flow separators were developed which included the first use of the mixing capability of the free jet nozzle. Such apparatus is shown, for example, in U.S. Pat. Nos. 3,852,408; 3,852,409 and 4,141,701. Due to the development of much smaller droplets, which were more effectively mixed with the gas stream, both particulate and acid gases were collected simultaneously with very high efficiency. Though far more efficient than the venturi scrubbers, these devices still required about 20–40 inches of water pressure drop to collect the desired amount of pollutants. In common with other wet scrubbing systems, the collection efficiency increased as the amount of energy delivered to the system increased.

The art has also developed pollution control systems that represent a combination of earlier developed devices. See, for example, U.S. Pat. No. 3,894,851. Thus it has been common to use a spray chamber followed by a cyclone separator or a venturi scrubber; a venturi jet scrubber followed by a separator; or two venturi jet scrubbers followed by a separator. U.S. Pat. No. 3,852,408 discloses a system for removing particulate and gaseous sulfur dioxide (or other acid gases) comprising a spray chamber for conditioning the polluted gas stream and removing large particulate, a hot-water drive and a chemical injection unit for driving the gas and capturing the remaining particulate and sulfur dioxide in water droplets, means for enlarging the droplets, and a cyclone separator for separating the water droplets containing the particulate and sulfur dioxide reaction products from the stream of cleaned gas. A similar system is shown in U.S. Pat. No. 3,852,409 wherein the driving system utilizes a steam ejector and a water spray in place of the hot water drive. A still further development is shown in U.S. Pat. No. 4,141,701 which discloses a drive system employing supersonic steam, air, or gas ejectors or subsonic free jet nozzles as the drive unit and an aerodynamic flow separating system to separate the pollutant-containing water drops from the cleaned gas. Another development is disclosed in U.S. Pat. No. 4,272,499. In this patent there is disclosed a process in which carrier gas is driven through a conduit, in part by a fan or blower, and the carrier gas is passed through a turbulent free jet emitted from a supersonic nozzle and containing a large number of small high velocity liquid droplets, the mixture of the carrier gas and free jet is passed through a subsonic nozzle, injecting additional liquid as droplets into the mixture, retaining the mixture in a mixing tube to promote further growth of the liquid droplets and separating the liquid droplets from the carrier gas. A still further development is taught in U.S. Pat. No. 4,921,886 wherein the process includes introducing a stream containing vapor and liquid droplets into a stream containing carrier gas and alkaline sorbent material, and thereafter a portion of the vapor is condensed and the alkaline sorbent material reacted with the acid gases to form reaction products, after which the products of reaction and the remaining alkaline sorbent material are separated from the carrier gas.

However, all these wet processes have a number of drawbacks and disadvantages. For one, their ability to separate smaller and smaller submicronic particulates is problematic and there is a need for a method, apparatus and system for being able to remove smaller particles than can be removed by the afore-mentioned processes. Additionally, the price of providing suitable power to run those processes has increased, particularly due to the increased cost of fuel to provide that power, whereby there is a need for a process that not only removes small particulates but is able to do so by requiring less power to operate the process so that the process is more economically feasible to operate.

SUMMARY OF THE INVENTION

This invention provides a method, system and apparatus for more efficiently removing pollutants, and particularly particulates, from a polluted carrier gas stream and additionally being able to remove small submicronic particulates, as well as other various gases and vapors. Additionally, in the invention the initial size of the pollutant is not controlling as is the case in prior art processes.

The new and novel method, system and apparatus of this invention utilizes moisture-containing sonic or supersonic waves moving through a subsonic flow of a polluted gas stream to modify or grow the pollutants in the gas stream so that they become removable or separable from the polluted gas stream.

In one aspect the process of this invention involves removing small sized pollutants from a polluted gas stream containing the pollutants, the improvement comprising: passing moisture-containing sonic or supersonic shock waves through a subsonic flow of the polluted gas stream as the polluted gas stream exits a subsonic free jet nozzle and enters into a contiguous chamber having an area of pressure of <14.7 psia adjacent the region of the free jet nozzle exit, whereby the pollutants are modified or grown as they pass through the shock waves and thereby become removable or separable from the polluted gas stream.

In a further aspect of this invention the process for removing pollutants from a polluted gas stream containing the pollutants comprises:

(a) providing a subsonic flow of the polluted gas stream through a subsonic free jet nozzle into a chamber having an area of pressure of <14.7 psia;

(b) introducing into the chamber, in the area of pressure of <14.7 psia and at one or more points adjacent entry of the polluted gas stream from the free jet nozzle into the chamber, moisture-containing sonic or supersonic shock waves which pass through the polluted gas stream in the chamber causing the pollutants to be modified or grown in size; and (c) removing the modified or grown pollutants from the stream of polluted gas.

In a further aspect of this invention there is provided apparatus or a system for removal of pollutants from a polluted gas stream, wherein the apparatus or system comprises:

(d) a subsonic free jet nozzle with an exit for providing a flow of said polluted gas stream;

(e) a chamber having an entry end and exit end, the entry end being connected to the subsonic free jet nozzle and surrounding the exit of the subsonic free jet nozzle for receiving the flow of the polluted gas stream in an area of the chamber having a pressure of <14.7 psia as the stream of polluted gas exits the subsonic free jet nozzle;

(f) one or more sonic or supersonic nozzles surrounding the exit of the subsonic free jet nozzle for providing moisture-containing sonic or supersonic shock waves for moving through the flow of polluted gas in the chamber and modifying or growing in size the pollutants in the polluted gas stream for removal of the pollutants from the polluted gas stream; and one or more separators connected to the chamber for separating the modified or grown pollutants from the polluted gas stream.

In the process or method according to this invention the pollutants in the polluted gas stream may comprises acidic pollutants or other gases or vapors, or small particulate matter that may be of micronic or submicronic size. In the process of this invention the acidic or other gases or vapors may be modified by reaction with suitable reagents to render them removable or separable from the polluted gas stream. The passage of the moisture-containing sonic or supersonic shockwaves through the polluted gas stream causes the reagent(s) to readily react with the gases or vapors to produce a product readily removable or separable from the polluted gas stream. The particulate pollutants in the polluted gas stream are caused to grow in size as they pass through the moisture-containing sonic or supersonic shock waves so that they become more readily removable or separable from the polluted gas stream. Submicronic particulates are caused to grow to at least micronic or greater sized particulates as they pass through the sonic or supersonic shock waves.

The reagent(s) for reaction with the acidic or other gases or vapors may be introduced into the system by being introduced into the stream of polluted gas upstream of the subsonic free jet nozzle, i.e., before the gas stream flows through the subsonic free jet nozzle, or may be introduced into the system in the moisture-containing sonic or supersonic shock waves which contact the subsonic flow of polluted gas as it exits the subsonic free jet nozzle exit.

The sonic or supersonic shock waves are preferably introduced into the polluted gas stream in the chamber in the area of pressure of <14.7 psia as a canopy of essentially continuous shock waves from a plurality of sonic or supersonic nozzles surrounding the exit of the free jet nozzle from which the polluted gas stream enters the chamber. In a particularly preferred embodiment of this invention the sonic or supersonic shock waves are shock waves of air and water or are such shock waves of steam.

In the apparatus or system of this invention the separator (s) may be any suitable separator useable for separating the pollutants from the polluted gas stream after the pollutants are modified or grown, but are preferably cyclone separators, or filter separators such as a bag house. Such separators are preferably connected to the exit end of the chamber. The separator(s) may also be drains provided in the chamber for removal of liquefied pollutants, or gravity separated particulates or the like.

The sonic or supersonic nozzles for introducing the shock waves into the polluted gas stream in the area of the chamber having a pressure of <14.7 psia will generally comprise a plurality of such nozzles surrounding the exit end of the subsonic free jet nozzle, and preferably will comprise at least three such sonic or supersonic nozzles located approximately 120° apart around the exit of the subsonic free jet nozzle. However, it will be appreciated that any suitable number of nozzles arranged and spaced any suitable degrees apart may be employed in accordance with this invention.

In a further aspect of this invention, the method or process and apparatus or system may utilize a sequential series of two or more connected series of subsonic free jet nozzles and adjoining chambers with sonic or supersonic nozzles for modifying or growing the pollutants in a polluted gas stream to be treated in accordance with this invention. In such a series of apparatus components, the entry end of the second chamber is connected to the exit end of the first chamber and surrounds a second subsonic free jet nozzle attached to the exit end of the first chamber, and additionally comprises one or more sonic or supersonic nozzles surrounding the second free jet nozzle for providing additional moisture-containing sonic or supersonic shock waves for moving through the flow of polluted gas stream in the second chamber for modifying or growing in size the pollutants in the polluted gas stream in the second chamber. In such an arrangement, either or both chambers may be provided with drain separators, and one or more separators of the cyclone type of fabric filter type are connected to the exit end of the second or last chamber in the series.

We describe this new apparatus and system using sonic or supersonic shock waves for removing pollutants from a polluted gas stream as a Thermo-Chemical Gas Cleaner (TCGC) since it is vastly different in operation than previously used gas cleaning apparatus and systems. The TCGC system provides a higher level of cleaning performance than previous systems and also has a lower energy requirement for the reasons explained hereinafter. In the TCGC the polluted gas is moved by a subsonic fan and subsonic free jet nozzles, and the gas is cleaned by the sonic or supersonic nozzles in a chamber of <14.7 psia and accelerates the polluted gas flowing from the subsonic nozzle. Additionally, the TCGC converts the thermal energy of the steam and/or water and the compression energy of the sonic or supersonic nozzles into kinetic working energy in the cleaning process. In the process of the invention, in addition to the growth and cleaning function of the sonic or supersonic nozzles, the exit flow produces increased flow velocity and reduced pressure in the process.

BRIEF DESCRIPTION OF THE DRAWINGS

The invention is illustrated, but not limited, by the following drawings in which:

FIGS. 1A and B are, respectively, diagrammatic illustrations of a acidic gas molecule before and after passing through a shock wave in the process of this invention;

FIGS. 2A and B are, respectively, diagrammatic illustrations of a pollutant particle before and after passing through a shock wave in the process of this invention;

FIG. 4 is a pressure, velocity and temperature profile of conditions during operation of a system of this invention.

DETAILED DESCRIPTION OF THE INVENTION

Figure 3:
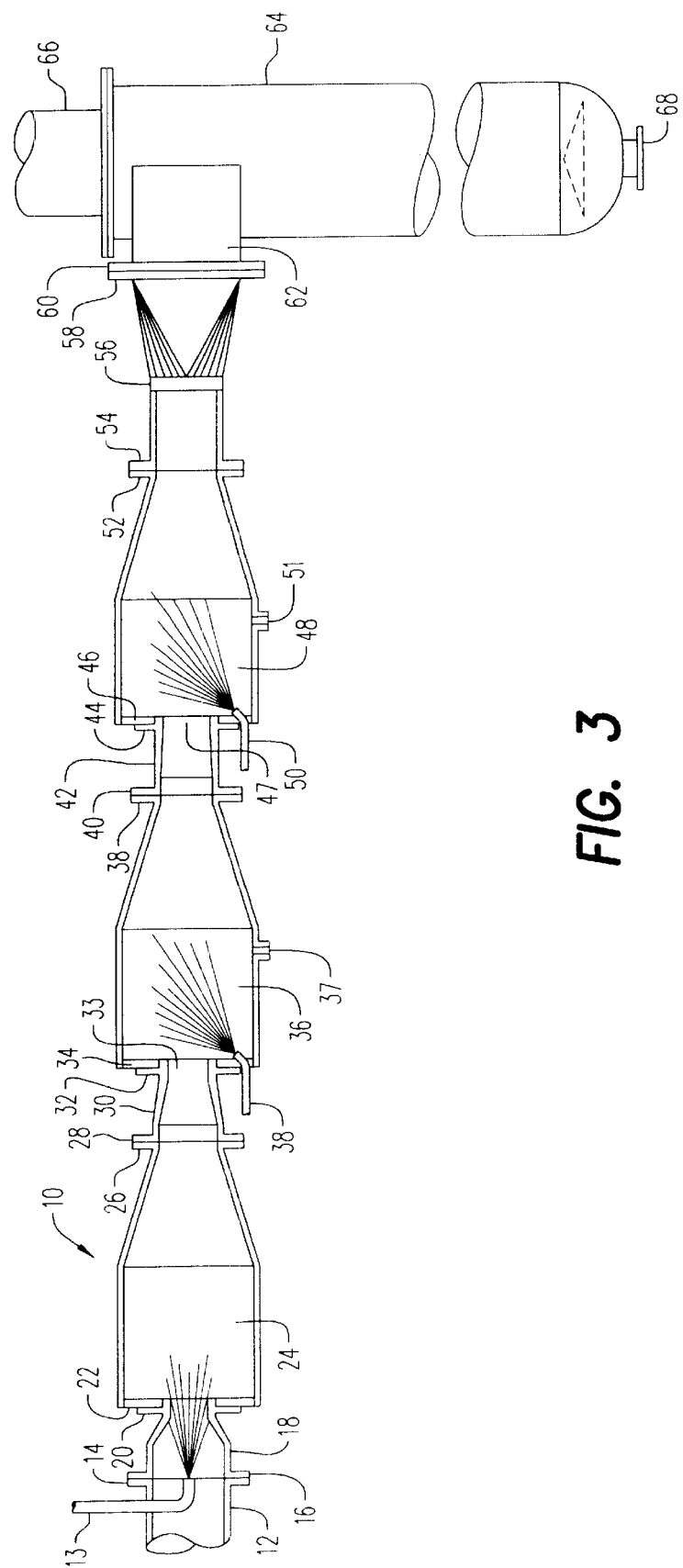
FIG. 3 is a view, partially in cross-section, of an apparatus or system of this invention.

This invention makes possible the capture of pollutants based on the number of pollutant particles rather than the heretofore criteria of the weight of the particles. Because previous systems and apparatus did not employ moving moisture-containing sonic or supersonic shock waves to move through a polluted gas stream those systems and apparatus were limited by the weight of the particles. This is so because the small, e.g. submicronic, pollutant particles exhibit Brownian movement and behave aerodynamically in such systems and go around or avoid contact with the collecting body (e.g. the moisture) and thus the small pollutant particles are not grown or modified. In contrast, the system and apparatus of this invention avoids this aerodynamic effect by moving the moisture-containing sonic or supersonic shock waves through the polluted gas stream causing essentially unavoidable contact between the pollutant particles and the reactant or moisture particles whereby the pollutant particles are modified and/or grow for easier removal.

In FIGS. 1A and 1B and 2A and 2B there is presented diagrammatic illustrations of the operation of the sonic or supersonic shock waves in the apparatus, system and process of this invention. FIGS. 1A and B illustrates the operation with respect to an acidic gas molecule pollutant in the polluted gas stream. In FIG. 1A such a shock wave S is shown approaching an acidic gas molecule and reagent therefor in a polluted gas stream. As the shock waves moved through the polluted gas stream (i.e. the acidic molecule and reagent move through the shock wave) the acidic molecule and reagent are caused to contact each other and react and to form a modified molecule M that can readily be removed from the polluted gas stream. The shock wave is the trigger for initiating the change and chemical reaction. It may also triggers the free energy of formation from the surrounding polluted gas stream causing the reaction to proceed like an avalanche in micro seconds and also enables or initiates the adiabatic cooling of the polluted gas stream by about 100 to about 200° F. in micro seconds. The heat in the polluted gas stream is given up and drives the chemical process. Similarly, in FIGS. 2A the shock wave S is shown approaching a particulate pollutant P. As the particulate pollutant is caused to move through the moisture-containing sonic or supersonic shock wave S collisions of the small particulate and the moisture are caused, thereby growing the particulate to a larger sized particulate P' that is more readily removable from the polluted gas stream.

Upon passing through the shock waves of this invention the polluted gas molecules or particles experience abrupt and discontinuous changes in pressure, density, velocity, temperature and entropy. This triggers a chemical reaction between the droplets of acidic gas, moisture and reagent.

In the process, apparatus and system of this invention there is no "going around" by the pollutant molecules or particulates. Rather, all the molecules or particulates must go through the sonic or supersonic shock waves whereby they are enslaved and grown or otherwise modified as determined by the process parameters. A continuous canopy of billions of shock waves insures that all pollutant molecules or particles pass through the waves which act as aerodynamic filters carrying kinetic and or thermal energy and also possibly reagent chemicals. Capture of the pollutants by this process can approach 100%.

An exemplary system 10 of this invention is illustrated if FIG. 3. A conduit 12 of any suitable type provides a polluted gas stream for purification. Generally, the polluted gas stream will be a heated polluted gas stream from a process operation, but will generally have been preconditioned, in way already known in the art such as by inlet pipe 13, to hold a suitable amount of moisture. Flange 14 of gas source conduit 12 is attached to flange 16 at the entrance end of a subsonic free jet nozzle 18. At the exit end of nozzle 18 flange 20 is attached to flange 22 of a mixing chamber 24. It will be appreciated that mixing chamber 24 is optional in the system of this invention. At the exit end of chamber 24 flange 26 is attached to flange 28 of a second subsonic free jet nozzle 30. At the exit end 33 of this second nozzle flange 32 is attached to flange 34 of reaction chamber 36. Surrounding the exit end 33 of the free jet nozzle 30 there is provided one or more sonic or supersonic nozzles 38 for introduction of moisture-containing sonic or supersonic shock waves. Preferably at least three such nozzles separated by about 120° are provided. As the subsonic flow of the polluted gas stream exits nozzle 30 into chamber 36 there is created an area of pressure of <14.7 psia in the chamber. It is into this area that the shock waves are introduced into the polluted gas stream whereby the shock waves pass through the stream of polluted gas causing the molecules and particulates in the stream to be altered, modified, grown or otherwise acted upon to render them more readily removable. The reaction chamber 36 can be provided with one or more drains 37 to permit removal of pollutants that separate out of the polluted gas stream by gravity as a result of the action of the shock waves on the pollutants in the stream. Flange 38 at the exit end of chamber 36 is connected to flange 40 at the entrance end of a further subsonic free jet nozzle 42 into which the shock wave treated polluted gas stream is caused to flow. Flange 44 at the exit end 47 of this nozzle 42 is connected to flange 44 of a further reaction chamber 48. Surrounding the exit end 47 of this subsonic free jet nozzle 42, again are, preferable three, sonic or supersonic nozzles separated by approximately 120°, for further introduction of moisture-containing shock waves into the polluted gas stream for causing further alteration, modification, growing or otherwise acting upon of the polluted molecules and/or particulates. Chamber 48 may also be provided with one or more drains 51 for removing separating pollutants. Flange 52 at the exit end of chamber 48 is attached to flange 54 at the entrance end of a diverging conduit 56 having a flange 58 at its exit end connected to a flange 60 of an inlet 62 of a separator 64. Separator 64 is provided with an outlet 66 for release of purified gas from the polluted gas stream and with a second outlet 68, preferably a drain for removal of altered, modified, grown or otherwise acted upon pollutant molecules or particulates from the polluted gas stream. The separator can be a cyclone separator, a fabric separator such as a bag house, or any other separator suitable for separating the pollutant molecules or particulates from the purified gas stream.

The polluted gas stream can be provided to the system by a subsonic blower fan that can be located upstream from the inlet conduit 12 or by a suction fan located downstream from separator outlet 66 or by any other suitably placed source of subsonic driving power. The sonic or supersonic nozzles also accelerate the flow of the polluted gas in the system.

It will be appreciated that although the invention has been illustrated with several sets of subsonic free jet nozzles and adjoining chambers with sonic or supersonic nozzles, the invention contemplates a system or apparatus where only one such set is required or where more than two such set in series may be preferred. Where only one such set, such as 30, 36 and 38, are employed the inlet 62 of the separator will be directly or indirectly connected to the exit end of the chamber 36.

In the process of this invention the use of the free jet nozzle for introduction of the stream of polluted gas into the larger chamber permits a process to be obtained in which flow of the polluted gas stream expands into the relatively larger chamber to provide free contact and mixing of the pollutants with the capture medium in free zones such that contact and mixing is not restrained. Flow of the polluted gas stream into the chamber will generally not contact the wall of the chamber in an area just downstream of the point of entry of the gas. As the flow of the polluted gas stream enters the chamber from the free jet nozzle a pressure drop occurs across the nozzle and the gas expands and enters an area of pressure of <14.7 psia in the chamber. Into this area of pressure of <14.7 psia the sonic or supersonic nozzles introduce the moisture-containing shock waves. As a result of the introduction of the shock waves and their passage through the polluted gas stream the molecules and particles are stripped of their protective boundary layers assuring contact and thereby their subsequent separation and collection. Also a condition is established whereby massive cooling by adiabatic expansion is established as the water from the steam or air and water provided by the sonic or supersonic nozzles enters the region of <14.7 psia and massive cooling occurs in the moisture-containing polluted gas and the moisture condensed around the pollutant molecules or particles in the polluted gas stream. Generally, the polluted gas stream will have been conditioned to carry from about 32 to about 45 grams of moisture per pound of polluted gas. The subsonic free jet nozzle is always operated full to produce the area of <14.7 psia pressure in the chamber.

The sonic or supersonic nozzles in combination with the subsonic free jet nozzle establish very favorable collision conditions of pressure, temperature and velocity for acting upon the pollutant molecules or particles for capturing and separating them from the gas stream. FIG. 4 shows a typical pressure, velocity and temperature profile for a system according to this invention. FIG. 4, where the reference numeral represent the elements designated by those reference numeral in FIG. 3, shows the influence of the subsonic free jet nozzle and also the sonic or supersonic cleaning nozzles on these three parameters The invention is thereby enabled to produce higher pollutant collection results with less expenditure of energy than prior systems and essentially prevent the pollutants from by-passing the collection bodies.

The acid gases that may be separated from the polluted gas stream in accordance with this invention include, but are not limited to, sulfur dioxide ($SO_2$), hydrogen sulfide ($H_2S$), hydrogen chloride (HCl), sulfurous or sulfuric acids ($H_2SO_3$ or $H_2SO_4$). The reagent is an alkaline agent and is finely pulverized hydrated lime ($Ca(OH)_2$) although pulverized lime (CaO) or limestone ($CaCO_3$) may also be used. Sodium based sorbents such as sodium carbonate ($Na_2CO_3$), sodium bicarbonate ($NaHCO_3$) or minerals containing these substances such as nahcolite and trona ore may be used but the sodium-based sorbents are generally more expensive than the calcium-based sorbents and, in addition, may pose disposal problems. The reaction product of the calcium-based sorbents and sulfur-containing acidic gases is essentially gypsum ($CaSO_4$) or hydrated gypsum ($CaSO_4.2H_2O$) which may easily be disposed of. The reaction between the alkaline reagent and the acid gas is facilitated or catalyzed by the presence of an existing liquid droplet or a condensed liquid droplet though the liquid droplet does not enter into the reaction. Preferably, though not necessarily, the liquid may be water. Preferably, the stream in which the liquid droplets are entrained comprises low pressure steam, although air at a range of humidity levels may also be used.

As an example of the operation of the methodology and apparatus of this invention there may be mentioned the following illustrative, but non-limiting, example illustrated in reference to the system 10 shown in FIG. 3. By a suitable upstream fan, about 15 lbs/min of waste process gas containing acidic molecule gas pollutants and particulate pollutants is introduced into conduit 12. It will be recognized that instead of an upstream fan a suitable downstream fan could be used to either pull the gas stream trough the system. Into this stream of polluted gas in conduit 12 a suitable reagent for reaction with the acidic molecule pollutants is introduced by inlet pipe 13. The reagent is preferably in a stream of waste steam at a pressure of 39.696 psia at a rate of 0.146 lb/min. The polluted gas stream now containing reagent and moisture from the steam passes through a 2.50 inch diameter subsonic free jet nozzle 18 into mixing and conditioning chamber 24 into an area of pressure of <14.7 psia. Saturated steam at a pressure of 39.696 psia is introduced into this low pressure area through three supersonic nozzles 38 placed 120° apart and at a rate of 0.167 lb/min through each nozzle. It will be appreciated that the method and system of this invention could employ any number of suitable placed sonic or supersonic nozzles, not just three such nozzles. This saturated steam enters the chamber 24 as supersonic shock waves that pass through the stream of polluted gas and reagent whereby the acidic molecules are caused to react with the reagent and the pollutant particles are caused to grow in size around nucleation sites in the shock waves. The treated stream of polluted gas passes through a second 2.75 inch diameter subsonic free jet nozzle 30 and into chamber 36 in another area of pressure of <14.7 psia where again supersonic shock waves are introduced into the gas stream through three supersonic nozzles 38, spaced about 120° apart, by way of saturated waste steam at a pressure of 39.696 psia at a rate of about 0.167 lb/min through each nozzle. This saturated steam enters the chamber 36 as supersonic shock waves that pass through the stream of polluted gas and reagent whereby acidic molecules are caused to react with the reagent and the pollutant particles are caused to grow in size around nucleation sites in the shock waves. This treated stream of polluted gas passes through a third 3.00 inch diameter subsonic free jet nozzle 42 and into chamber 48 in another area of pressure of <14.7 psia where again supersonic shock waves are introduced into the gas stream through three supersonic nozzles 50, spaced about 120° apart, by way of saturated waste steam at a pressure of 39.696 psia at a rate of about 0.167 lb/min through each nozzle. This saturated steam enters the chamber 48 as supersonic shock waves that pass through the stream of polluted gas and reagent whereby acidic molecules are caused to react with the reagent and the pollutant particles are caused to grow in size around nucleation sites in the shock waves. Pollutants, that separate from the polluted gas stream in chambers 36 and 48 by gravity, can be withdrawn from the chambers through drains 37 and 51. The treated polluted gas stream flows out of chamber 48 into diverging conduit 56 and separator inlet 62 into cyclone separator 64 where the pollutant particles are separated from the gas stream to produce a flow of essentially unpolluted gas through outlet 66 while the pollutants are withdrawn through outlet 68. Since all the acidic molecules and pollutant particles in the polluted gas stream entering conduit 12 have passed through moisture-containing supersonic hock waves they are all easily removed in the system of the invention and the gas stream exiting separator 64 through outlet 66 is essentially free of acidic molecules and pollutant particles.

It will be appreciated that although the invention has been described in connection with certain embodiments, the invention is not so limited and modification can be made thereto by those skilled in the art without departing from the spirit and scope of the invention.

We claim:

1. In a process for removing small sized pollutants from a polluted gas stream containing the pollutants, the improvement comprising:

passing moisture-containing sonic or supersonic shock waves through a subsonic flow of the polluted gas stream as the polluted gas steam exits a subsonic free jet nozzle and enters into a contiguous chamber having an area of pressure of <14.7 psia adjacent the region of the free jet nozzle exit, whereby the pollutants are modified or grown as they pass through the shock waves and thereby become removable or separable from the polluted gas stream.

2. A process according to claim 1 wherein the pollutants comprise acidic gases or vapors, and a reagent, reactive with the acidic gases or vapors as the shock waves pass through the polluted gas stream, is provided in the stream of polluted gas.

3. A process according to claim 1 wherein the pollutants comprise micronic or submicronic particulates.

4. A process according to claim 1 wherein the pollutants comprise submicronic particulates.

5. A process according to claim 4 wherein the submicronic particles are caused to grow to at least micronic size as the shock waves pass through the polluted gas stream.

6. A process according to claim 1 wherein the shock waves are introduced into the polluted gas stream in the chamber in the area of pressure of <14.7 psia as a canopy of essentially continuous shock waves from a plurality of sonic or supersonic nozzles surrounding the exit of the free jet nozzle from which the polluted gas stream enters the chamber.

7. A process of claim 6 wherein the shock waves comprise supersonic shock waves of steam.

8. A process according to claim 6 wherein the shock waves comprise supersonic shock waves of air and water.

9. A process according to claim 6 wherein the shock waves comprise sonic or supersonic shock waves of moisture and at least one reagent capable of reacting with acidic gas pollutants in the polluted gas stream.

10. A process for removal of pollutants from a polluted gas stream containing said pollutants, the process comprising:
    (a) providing a subsonic flow of the polluted gas stream through a subsonic free jet nozzle into a chamber having an area of pressure of <14.7 psia;
    (b) introducing into the chamber, in the area of pressure of <14.7 psia and at one or more points adjacent entry of the polluted gas stream from the free jet nozzle into the chamber, moisture-containing sonic or supersonic shock waves which pass through the polluted gas stream in the chamber causing the pollutants to be modified or grown in size; and
    (c) removing the modified or grown pollutants from the stream of polluted gas.

11. A process according to claim 10 wherein the pollutants comprise acidic gases or vapors, and a reagent, reactive with the acidic gases or vapors as the shock waves pass through the polluted gas stream, is provided in the stream of polluted gas stream.

12. A process according to claim 10 wherein the pollutants comprise micronic or submicronic particulates.

13. A process according to claim 10 wherein the pollutants comprise submicronic particulates.

14. A process according to claim 13 wherein the submicronic particles are caused to grow to at least micronic size as the shock waves pass through the polluted gas stream.

15. A process according to claim 10 wherein the shock waves are introduced into the polluted gas stream in the chamber in the area of pressure of <14.7 psia as a canopy of essentially continuous shock waves from a plurality of sonic or supersonic nozzles surrounding the exit of the free jet nozzle from which the polluted gas stream enters the chamber.

16. A process according to claim 15 wherein the shock waves comprise supersonic shock waves of steam.

17. A process according to claim 15 wherein the shock waves comprise supersonic shock waves of air and water.

18. A process according to claim 15 wherein the shock waves comprise sonic or supersonic shock waves of moisture and at least one reagent capable of reacting with acidic gas pollutants in the polluted gas stream.

19. Apparatus for removing pollutants from a polluted gas stream containing said pollutants, the apparatus comprising:
    (a) a subsonic free jet nozzle with an exit for providing a flow of said polluted gas stream;
    (b) a chamber having an entry end and exit end, the entry end being connected to the subsonic free jet nozzle and surrounding the exit of the subsonic free jet nozzle for receiving the flow of the polluted gas stream in an area of the chamber having a pressure of <14.7 psia as the stream of polluted gas exits the subsonic free jet nozzle;
    (c) one or more sonic or supersonic nozzles surrounding the exit of the subsonic free jet nozzle for providing moisture-containing sonic or supersonic shock waves for moving through the flow of polluted gas in the chamber and modifying or growing in size the pollutants in the polluted gas stream for removal of the pollutants from the polluted gas stream; and
    (d) one or more separators connected to the chamber for separating the modified or grown pollutants from the polluted gas stream.

20. The apparatus of claim 19 wherein the one or more separators are connected to the exit end of the chamber.

21. The apparatus of claim 19 additionally comprising a source of reagent and moisture upstream of the exit of the subsonic free jet nozzle, for introduction of the reagent and moisture into the polluted gas stream before the polluted gas stream exits the subsonic free jet nozzle.

22. The apparatus of claim 19 wherein the one or more separators comprise at least one drain in the chamber.

23. The apparatus of claim 20 wherein the sonic or supersonic nozzles comprise three sonic or supersonic nozzles located approximately 120° apart around the exit of the subsonic free jet nozzle.

24. The apparatus of claim 20 wherein the one or more separators comprise one or more cyclone separators.

25. The apparatus of claim 20 wherein the one or more separators comprise one or more fabric filters.

26. The apparatus of claim 24 additionally comprising one or more drains in the chamber.

27. The apparatus of claim 25 additionally comprising one or more drains in the chamber.

28. The apparatus of claim 19 wherein the one or more separators are connected to the chamber through a second chamber having an entry end and an exit end; the entry end of the second chamber being connected to the exit end of the first chamber and surrounding a second subsonic free jet nozzle attached to the exit end of the first chamber, and additionally comprising one or more sonic or supersonic nozzles surrounding the second free jet nozzle for providing additional moisture-containing sonic or supersonic shock waves for moving through the flow of polluted gas stream in the second chamber for modifying or growing in size the pollutants in the polluted gas stream in the second chamber.

* * * * *